United States Patent
Seo et al.

(10) Patent No.: US 11,764,633 B2
(45) Date of Patent: Sep. 19, 2023

(54) BUSBAR UNIT FOR MOTOR

(71) Applicant: HYUNDAI MOBIS CO., LTD., Seoul (KR)

(72) Inventors: Yeong Woo Seo, Yongin-si (KR); Seong Jun Hwang, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 65 days.

(21) Appl. No.: 17/361,753

(22) Filed: Jun. 29, 2021

(65) Prior Publication Data

US 2022/0014065 A1 Jan. 13, 2022

(30) Foreign Application Priority Data

Jul. 10, 2020 (KR) .................. 10-2020-0085687

(51) Int. Cl.
*H02K 3/50* (2006.01)
*H02K 3/52* (2006.01)
*H02K 3/38* (2006.01)
*H02K 5/04* (2006.01)

(52) U.S. Cl.
CPC ............. *H02K 3/50* (2013.01); *H02K 3/38* (2013.01); *H02K 3/52* (2013.01); *H02K 5/04* (2013.01); *H02K 2203/09* (2013.01)

(58) Field of Classification Search
CPC .......... H02K 3/522; H02K 5/225; H02K 5/04; H02K 3/38; H02K 3/50; H02K 3/52; H02K 5/22; H02K 2203/09; H02K 1/278; H02K 3/28; H02K 3/505

USPC .......................................................... 310/71
See application file for complete search history.

(56) References Cited

U.S. PATENT DOCUMENTS

| 2014/0152130 A1* | 6/2014 | Shimano ............. H02K 11/046 310/71 |
| 2019/0229577 A1* | 7/2019 | Sambuichi ............. H02K 5/225 |
| 2020/0313504 A1* | 10/2020 | Okochi .................... H02K 7/14 |

FOREIGN PATENT DOCUMENTS

WO WO-2019082710 A1 * 5/2019 ............... H02K 3/38

OTHER PUBLICATIONS

Okita et al, Motor, May 2, 2019, WO 2019082710 (English Machine Translation) (Year: 2019).*

* cited by examiner

*Primary Examiner* — Alexander A Singh
(74) *Attorney, Agent, or Firm* — NSIP Law

(57) ABSTRACT

A busbar unit that is electrically connected to a motor, the motor including a coil would around a stator, the busbar unit including: a terminal including a body, and a terminal portion protruding from an inner circumferential surface of the body; and a holder including a holder body configured to support the body, and a terminal holder portion disposed on an inner circumferential surface of the holder body and configured to electrically connect the terminal portion and the coil.

16 Claims, 12 Drawing Sheets

BUSBAR UNIT FOR MOTOR

CROSS-REFERENCE TO RELATED APPLICATION

This application claims priority to and the benefit of Korean Patent Application No. 10-2020-0085687 filed in the Korean Intellectual Property Office on Jul. 10, 2020, the entire contents of which are incorporated herein by reference.

TECHNICAL FIELD

The present disclosure relates to a busbar unit for a motor, and more particularly, to a busbar unit for a motor that has improved durability, stability, and reliability.

BACKGROUND ART

A hybrid vehicle or an electric vehicle, which is called an environmentally-friendly vehicle, generates driving power using an electric motor (hereinafter, referred to as a 'drive motor') that obtains rotational force from electrical energy.

In general, the drive motor includes a stator coupled to a housing, and a rotor rotatably disposed in the stator with a predetermined air gap from the stator.

The stator includes stator cores formed by stacking electrical steel sheets, and stator coils wound around the stator cores.

A busbar is provided at an upper side of the stator, and the stator coils are connected to an external power source through the busbar.

The busbar is structured to include a plurality of terminals inside a ring-shaped holder, and the terminals are constituted as a combination of phase terminals connected to U-phase, V-phase, and W-phase power sources, and a neutral terminal that connects the phase terminals.

The stator coils are fused with terminal portions of the terminals by being welded to the terminal portions of the terminals (e.g., welded by applying electric current) in a state in which the stator coils are compressed. After the terminal portions of the terminals are fused with the stator coils, an insulating material (e.g., epoxy) for insulation between the terminals is applied to cover the terminal portions of the terminals.

In the related art, however, both a compressing force and heat are applied to the stator coil during a process of fusing the stator coil with the terminal portion of the terminal, which causes a deterioration in strength and durability of the stator coil.

In addition, when the motor vibrates or external impact is applied to the motor, the fused portion of the stator coil, which has low strength, is easily damaged or separated from the terminal portion of the terminal.

Therefore, recently, various studies are conducted to improve durability, stability, and reliability of the coil, but the study results are still insufficient. Accordingly, there is a need to develop a technology for improving durability, stability, and reliability of the coil.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a busbar unit configured to be electrically connected to a motor, the motor including a coil wound around a stator, the busbar unit including: a terminal including a body and a terminal portion protruding from an inner circumferential surface of the body; and a holder including a holder body configured to support the body and a terminal holder portion disposed on an inner circumferential surface of the holder body and configured to electrically connect the terminal portion and the coil.

The terminal holder portion may be configured to fix the coil to the terminal portion such that the coil and the terminal portion are in close contact with each other.

The terminal holder portion may have a terminal hole therein, the terminal portion may be disposed at one side in the terminal hole, and the coil may be accommodated at the other side in the terminal hole so as to be in close contact with the terminal portion.

The terminal portion may include: a terminal body disposed in the terminal holder portion; and a contact terminal disposed at an end of the terminal body and disposed in the terminal hole so as to be in contact with the coil.

The contact terminal may include a contact surface that contacts the coil.

The busbar unit may include a bushing having a bushing hole and disposed in the terminal hole, and the coil and the terminal portion may be accommodated in the bushing hole.

The busbar unit may include a pressing protrusion protruding from an inner wall surface of the bushing hole.

The bushing and the terminal holder portion may be insert-injection molded.

The busbar unit may include a fixing protrusion protruding from an outer surface of the bushing, and the terminal holder portion may surround the fixing protrusion.

The fixing protrusion may be disposed continuously around the bushing.

The busbar unit may include a guide member connected to the bushing and configured to guide the coil to the bushing hole.

The guide member may include an inclined guide portion configured to guide the coil to the bushing hole.

The inclined guide portion may include: a first inclined guide surface corresponding to a first side of the bushing hole that faces the coil; a second inclined guide surface connected to a first end of the first inclined guide surface and corresponding to a second side of the bushing hole; and a third inclined guide surface connected to a second end of the first inclined guide surface and corresponding to a third side of the bushing hole.

The busbar unit may include a restriction protrusion protruding from an inner wall surface of the bushing hole and configured to restrict the coil.

The restriction protrusion may have a triangular cross-sectional shape.

The terminal holder portion and the holder body may be integrally injection molded.

Other features and aspects will be apparent from the following detailed description, the drawings, and the claims.

DETAILED DESCRIPTION

Figure 1:
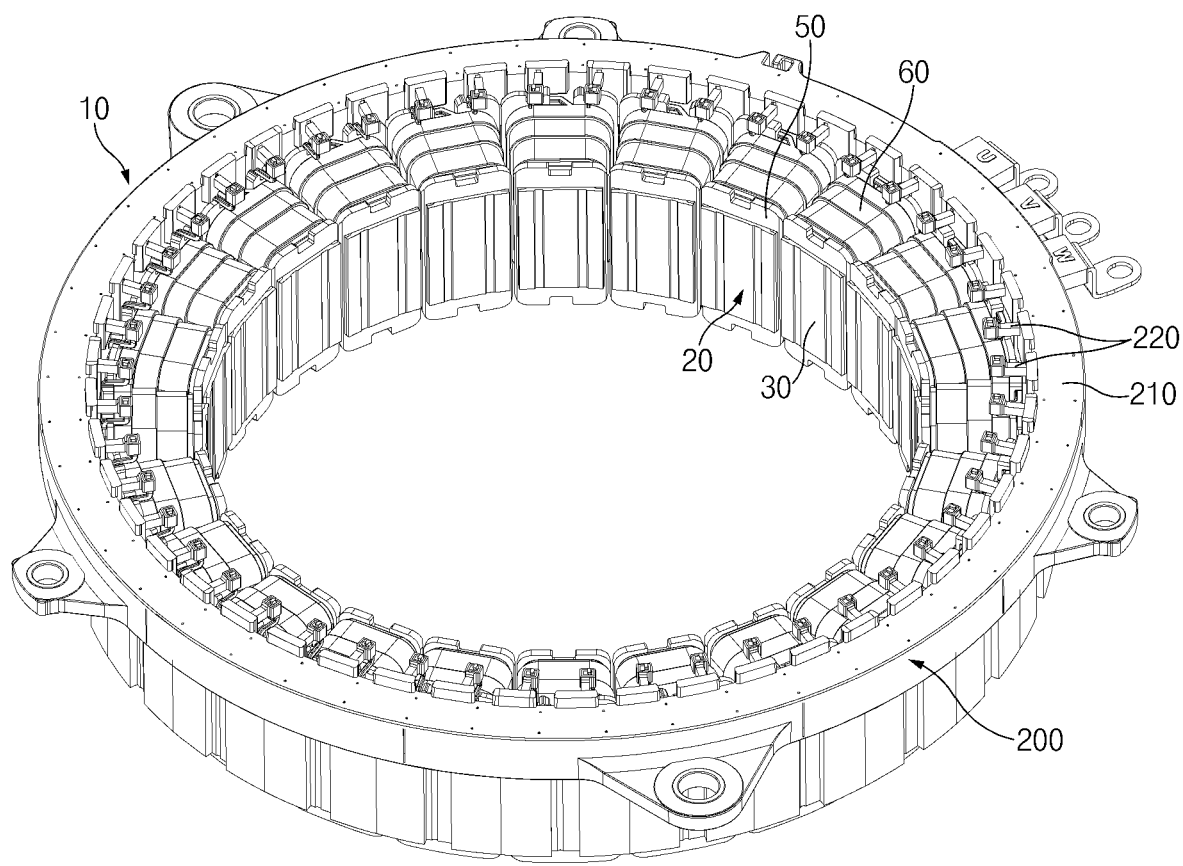
FIG. 1 is a view for explaining an example in which a busbar unit for a motor according to an embodiment of the present disclosure is mounted.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 7, a busbar unit 10 for a motor according to an embodiment of the present disclosure is electrically connected to a motor including a stator 20 around which coils 60 are wound. The busbar unit 10 includes: terminals 100 each including a body 110, and terminal portions 120 protruding from an inner circumferential surface of the body 110; and a holder 200 including a holder body 210 configured to support the body 110, and terminal holder portions 220 provided on an inner circumferential surface of the holder body 210 and configured to electrically connect the terminal portions 120 and the coils 60.

For reference, the busbar unit 10 for a motor according to the embodiment of the present disclosure may be mounted in various types of motors in accordance with required conditions and design specifications, and the present disclosure is not restricted or limited by the types and structures of the motors.

As an example, a motor, to which the busbar unit 10 according to the exemplary embodiment of the present disclosure is applied, may be used as a drive motor for an environmentally-friendly vehicle, such as a hybrid vehicle and/or an electric vehicle, which obtains driving power from electrical energy.

For example, the drive motor is an inner-rotor-type synchronous motor and includes the stator 20 installed in a motor housing (not illustrated), and a rotor (not illustrated) rotatably installed in the stator 20 with a predetermined air gap from the stator 20. The busbar unit 10 according to the exemplary embodiment of the present disclosure may be connected to the stator 20.

The stator 20 may be accommodated in the housing (not illustrated), and the coil 60 may be wound around the stator 20 so as to induce an electrical interaction between the stator and the rotor.

For example, the stator 20 includes a plurality of split cores 30 provided to cooperatively define a ring shape, and a support ring (not illustrated) provided to surround outer circumferential surfaces of the plurality of split cores 30.

The split core 30 may be variously changed in number and structure in accordance with required conditions and design specifications, and the present disclosure is not restricted or limited by the number of split cores 30 and the structure of the split core 30.

More specifically, the split core 30 may be provided by stacking a plurality of electrical steel sheets in an axial direction of the rotor.

A bobbin 50 (made of plastic, for example) is provided around each of the split cores, and the coil 60 is wound around the bobbin 50.

According to another exemplary embodiment of the present disclosure, the stator may include as a single core.

The rotor is provided to be rotated by the electrical interaction between the stator 20 and the rotor.

As an example, the rotor may include a rotor core (not illustrated) and magnets (not illustrated). The rotor core may be structured by stacking a plurality of circular plates each provided in the form of a thin steel sheet or structured in the form of a bin.

A hole (not illustrated), to which a shaft is coupled, may be provided at a center of the rotor. Protrusions (not illustrated), which guide the magnets, may protrude from an outer circumferential surface of the rotor core. The magnets may be attached to the outer circumferential surface of the rotor core so as to be spaced apart from one another at predetermined intervals in a circumferential direction of the rotor core.

In addition, the rotor may include a can member (not illustrated) disposed to surround the magnets and configured to prevent the separation of the magnets.

The busbar unit 10 includes the terminals 100 and the holder 200, and the busbar unit 10 is disposed at the upper side of the stator 20.

The terminal 100 is provided to electrically connect the coil 60 of the stator 20 to an external power source.

Figure 2:
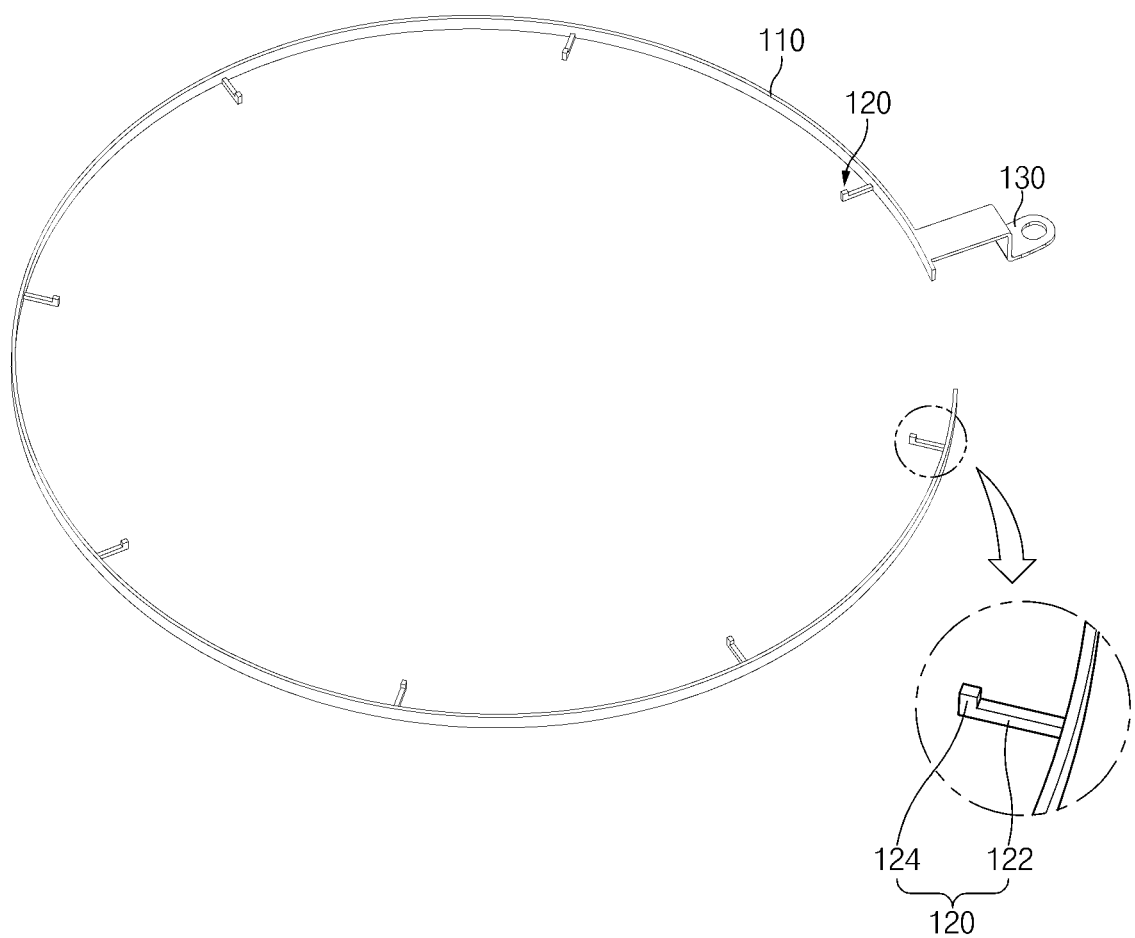
FIG. 2 is a view for explaining a terminal of the busbar unit for a motor according to the embodiment of the present disclosure.
Figure 3:
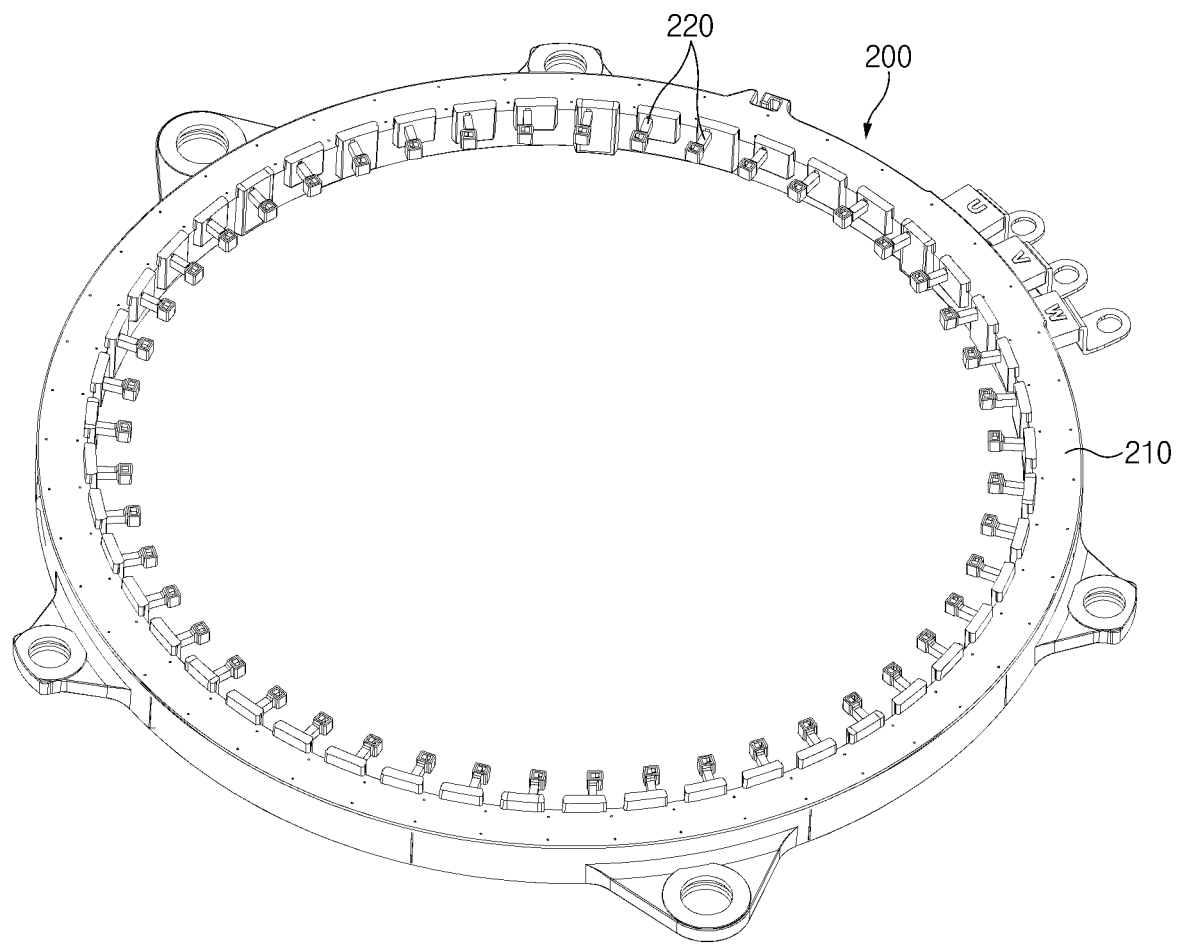
FIG. 3 is a view for explaining a holder of the busbar unit for a motor according to the embodiment of the present disclosure.

Referring to FIG. 2, the terminal 100 may be at least one of phase terminals (a U-phase terminal, a V-phase terminal, and a W-phase terminal) connected to a U-phase power source, a V-phase power source, and a W-phase power source and a neutral terminal for electrically connecting the phase terminals. For example, the busbar unit 10 may include a total of four terminals 100 (the U-phase terminal, the V-phase terminal, the W-phase terminal, and the neutral terminal).

More specifically, the terminal 100 includes the body 110 accommodated in the holder 200, and the terminal portions 120 protruding from the inner circumferential surface of the body 110 and connected to the coils 60.

The structure and shape of the body 110 may be variously changed in accordance with required conditions and design specifications. For example, the body 110 may have a single-layered structure and may be provided as a band member in the form of an arc (or a ring) having a predetermined curvature.

According to another embodiment of the present disclosure, the body may have a double-layered structure (multilayer structure) having a bent portion.

The terminal portion 120 is provided on the inner circumferential surface of the body 110, and an end 60a of the coil 60 of the stator 20 is connected to the terminal portion 120.

The terminal portion 120 may have various structures to which the end 60a of the coil 60 may be connected, and the present disclosure is not restricted or limited by the structure and shape of the terminal portion 120.

For example, the terminal portion 120 may include a terminal body 122 protruding from the inner circumferential surface of the body 110, and a contact terminal 124 provided at an end of the terminal body 122.

Figure 7:
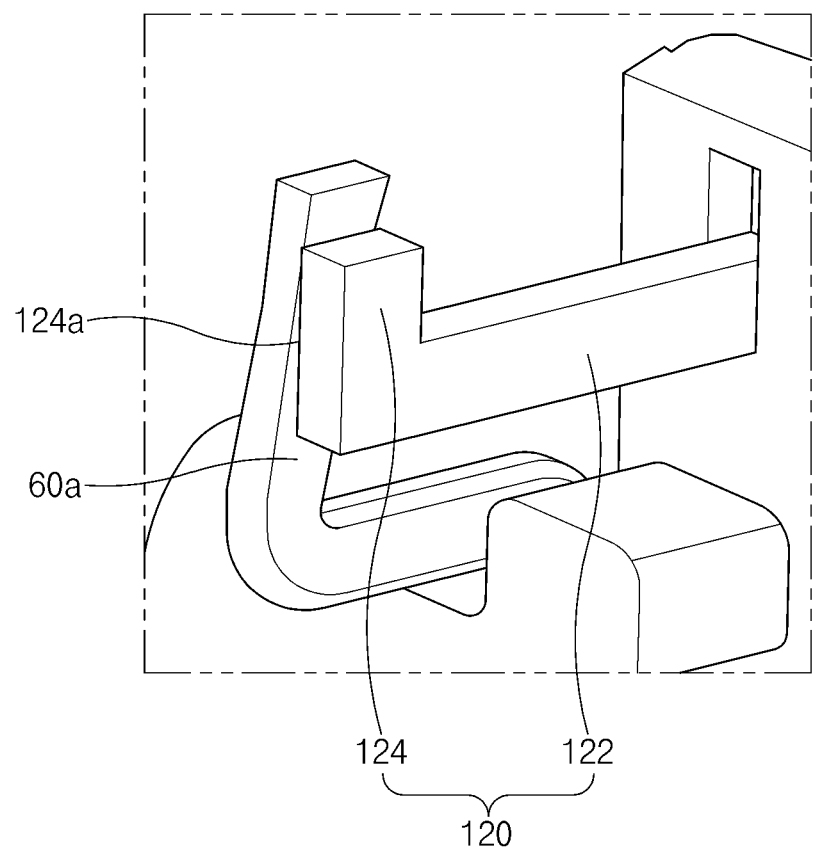

For example, referring to FIG. 7, the terminal body 122 may protrude in a horizontal direction (based on FIG. 7) from the inner circumferential surface of the body 110. The contact terminal 124 may be bent upward from the end of the terminal body 122, such that the terminal body 122 and the contact terminal 124 may cooperatively define an approximately "L" shape.

Particularly, the contact terminal 124 has a contact surface 124a that may be is surface contact with the end 60a of the coil 60. As described above, since the contact terminal 124 is bent from the end of the terminal body 122 and the end 60a of the coil 60 is in surface contact with the contact surface 124a provided on the contact terminal 124, a sufficient contact area may be ensured between the coil 60 and the terminal portion 120 without increasing a size of the terminal portion 120, which makes it possible to manufacture the terminal portion 120 and the busbar unit 10 each having a smaller size. As a result, it is possible to obtain an advantageous effect of minimizing an increase in size of the motor caused by the busbar mounted to implement a control circuit for the motor and contributing to the miniaturization of the motor.

In the embodiment of the present disclosure described and illustrated above, the example in which each of the terminal body 122 and the contact terminal 124 has a straight shape has been described. However, according to another embodiment of the present disclosure, each of the terminal body and the contact terminal may have a curved shape (e.g., an arc shape) or other structures.

In addition, the terminal 100 may include a power terminal portion 130 protruding from an outer circumferential surface of the holder 200.

The power terminal portion 130 extends from an outer surface of the body 110 and protrudes from the outer circumferential surface of the holder 200. The power terminal portion 130 may be electrically connected to each of external power cables corresponding to the respective phases (the U-phase, the V-phase, and the W-phase).

The holder 200 is provided to support the arrangement state of the terminals 100 and electrically insulate the terminals 100.

More specifically, the holder 200 includes the holder body 210 configured to support the body 110, and the terminal holder portions 220 provided on the inner circumferential surface of the holder body 210 and configured to electrically connect the terminal portions 120 and the coils 60.

The material and shape of the holder body 210 may be variously changed in accordance with required conditions and design specifications, and the present disclosure is not restricted or limited by the material and shape of the holder body 210.

For example, the holder body 210 may have a hollow ring shape and be provided as a molded product (made of an insulating material, for example) provided by injection molding.

The terminal holder portion 220 is provided on the inner circumferential surface of the holder body 210 so as to electrically connect the terminal portion 120 and the coil 60.

In the embodiment of the present disclosure, the configuration in which the terminal holder portion 220 electrically connects the terminal portion 120 and the coil 60 means that a contact state between the terminal portion 120 and the coil 60 is maintained (supported) by the terminal holder portion 220.

In particular, the terminal holder portion 220 is configured to fix the coil 60 and the terminal portion 120 such that the coil 60 and the terminal portion 120 are in close contact with each other.

The terminal holder portion 220 may have various structures capable of electrically connecting the terminal portion 120 and the coil 60 (fixing the terminal portion 120 and the coil 60 such that the terminal portion 120 and the coil 60 are in close contact with each other), and the present disclosure is not restricted or limited by the structure of the terminal holder portion 220.

For example, the terminal holder portion 220 has a terminal hole 220a. The terminal portion 120 is disposed at one side in the terminal hole 220a, and the coil 60 is accommodated at the other side in the terminal hole 220a so as to be in close contact with the terminal portion 120.

In particular, the terminal holder portion 220 is provided to surround the terminal body 122, and the terminal portion 120 is exposed through the terminal hole 220a provided in the terminal holder portion 220.

In more particular, the terminal holder portion 220 and the holder body 210 may be integrally provided by injection molding. According to another embodiment of the present disclosure, the terminal holder portion may be manufactured separately and then coupled to the holder body.

The terminal hole 220a may have various shapes and structures capable of allowing the contact terminal 124 to be exposed therethrough and allowing the coil 60 to be inserted thereinto.

For example, the terminal hole 220a may be provided in the form of a quadrangular hole. According to the embodiment of the present disclosure, the terminal hole 220a may have a circular shape, an elliptical shape, or other shapes, and the present disclosure is not restricted or limited by the shape and structure of the terminal hole 220a.

In particular, the terminal 100 and the holder 200 may be integrally connected by insert-injection molding. The contact terminal 124 of the terminal 100 is disposed in the terminal hole 220a and exposed through the terminal hole 220a.

In more particular, the end 60a of the coil 60 may be inserted into the terminal hole 220a at the same time when the busbar unit 10 is assembled (or disposed) at the upper side of the stator. In addition, the end 60a of the coil 60 and the contact terminal 124 may be kept in close contact with each other in the state in which the end 60a of the coil 60 is inserted into the terminal hole 220a.

As described above, according to the embodiment of the present disclosure, the coil 60 and the terminal portion 120 may be electrically connected by the terminal holder portion 220 without applying a compressing force and heat to the coil 60 and the terminal portion 120, which makes it possible to exclude a separate fusing process of electrically connecting the terminal 100 and the coil 60. As a result, it is possible to obtain an advantageous effect of minimizing the damage to the coil 60 and the deterioration in durability of the coil 60 and improving stability and reliability. Therefore, since the strength and durability of the coil 60 may be sufficiently ensured, it is possible to obtain an advantageous effect of minimizing the damage to and the deformation of the coil 60 caused by the vibration of the motor or the external impact applied thereto and preventing the coil 60 from separating from the terminal portion 120.

Moreover, in the embodiment of the present disclosure, since the end 60a of the coil 60 and the contact terminal 124 are electrically connected at the same time when the busbar unit 10 is assembled at the upper side of the stator, a fusing process of electrically connecting the terminal 100 and the coil 60 may be excluded. Therefore, it is possible to obtain an advantageous effect of further simplifying the manufacturing process, improving the work efficiency, and reducing the manufacturing time.

Figure 4:
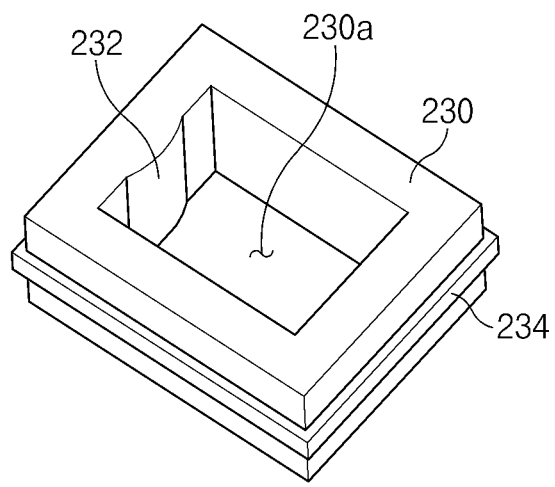
FIG. 4 is a view for explaining a bushing of the busbar unit for a motor according to the embodiment of the present disclosure.
Figure 5:
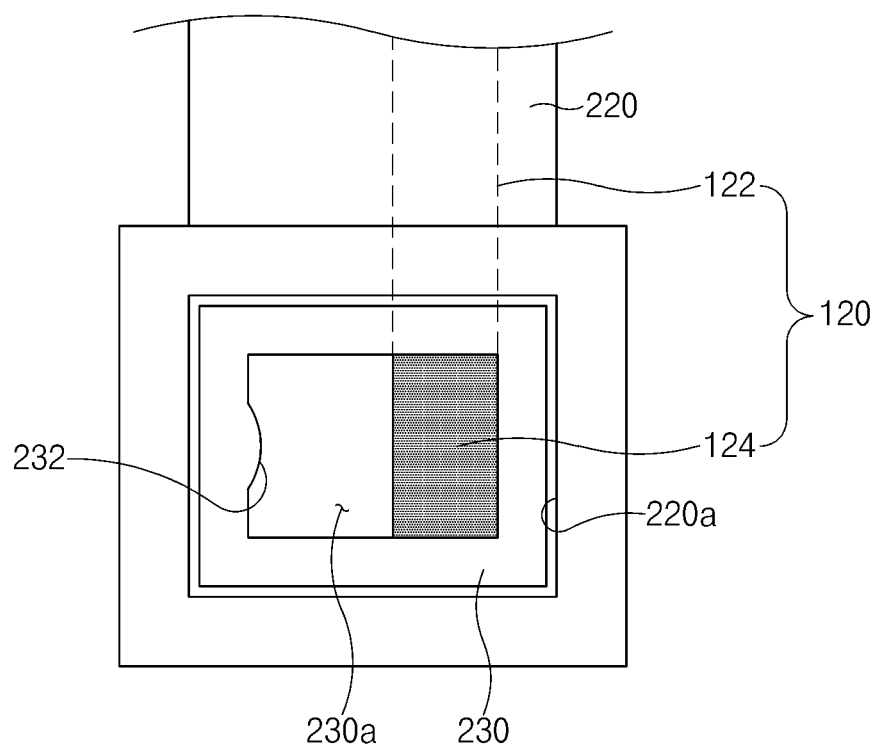
FIG. 5 is a top plan view for explaining a structure in which a terminal portion of the busbar unit for a motor according to the embodiment of the present disclosure is disposed.
Figure 6:
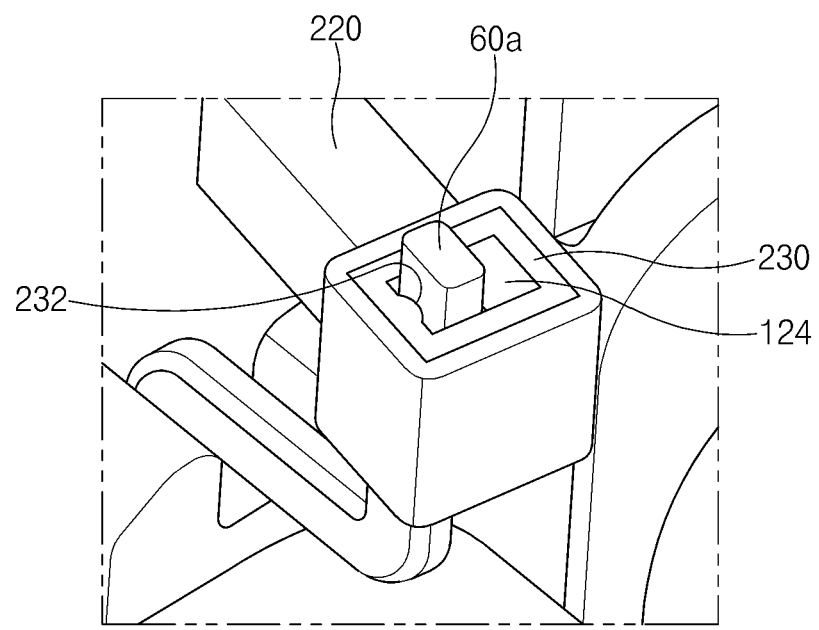
FIGS. 6 and 7 are views for explaining a structure in which the terminal portion of the busbar unit for a motor according to the embodiment of the present disclosure is connected to a coil.

Referring to FIGS. 4 to 6, according to the exemplary embodiment of the present disclosure, the busbar unit 10 may include bushings 230 each having a bushing hole 230a and provided in the terminal hole 220a. The coil 60 and the terminal portion 120 may be accommodated in the bushing hole 230a.

In particular, the bushing 230 is made of a material having a relatively higher strength than a material of the terminal holder portion 220 (or the holder).

As described above, since the bushing 230 is provided in the terminal hole 220a and the coil 60 and the terminal portion 120 are accommodated in the bushing hole 230a, it is possible to obtain an advantageous effect of stably maintaining the arrangement state of the coil 60 (the state in which the coil is inserted into the bushing hole so as to be in contact with the terminal portion) and improving stability and reliability.

The bushing 230 may have various structures having the bushing hole 230a, and the present disclosure is not restricted or limited by the structure of the bushing 230.

For example, the bushing 230 may be provided in the form of a hollow quadrangular ring, and the bushing hole 230a may be provided in the form of a quadrangular hole in the bushing 230.

According to the exemplary embodiment of the present disclosure, a pressing protrusion 232 may protrude from an inner wall surface of the bushing hole 230a.

For example, the pressing protrusion 232 may protrude from the inner wall surface of the bushing hole 230a so as to face the coil 60.

As described above, since the pressing protrusion 232 is provided on the inner wall surface of the bushing hole 230a, the end 60a of the coil 60 may be in tight contact with (pressed against) the contact terminal 124. Therefore, it is possible to obtain an advantageous effect of more stably maintaining the arrangement state of the coil 60 inserted into the bushing hole 230a.

The pressing protrusion 232 may be variously changed in structure and number in accordance with required conditions and design specifications, and the present disclosure is not restricted or limited by the structure of the pressing protrusion 232 and the number of pressing protrusions 232.

According to the exemplary embodiment of the present disclosure, the bushing 230 and the terminal holder portion 220 may be provided by insert-injection molding. According to another embodiment of the present disclosure, the terminal holder portion may be assembled or coupled to surround the bushing.

In particular, a fixing protrusion 234 may protrude from an outer surface of the bushing 230, and the terminal holder portion 220 may be disposed to surround the fixing protrusion 234.

As described above, since the fixing protrusion 234 may be provided on the outer surface of the bushing 230 and the terminal holder portion 220 is disposed to surround the periphery of the fixing protrusion 234, it is possible to obtain an advantageous effect of inhibiting the bushing 230 from separating from the terminal holder portion 220 and stably maintaining the arrangement state of the bushing 230.

In more particular, the fixing protrusion 234 is provided in the form of a continuous band around the bushing 230. Since the fixing protrusion 234 is provided continuously around the bushing 230 as described above, it is possible to obtain an advantageous effect of more securely maintaining the arrangement state of the bushing 230.

According to another embodiment of the present disclosure, a plurality of fixing protrusions may be disposed to be spaced apart from one another around the bushing.

Figure 8:
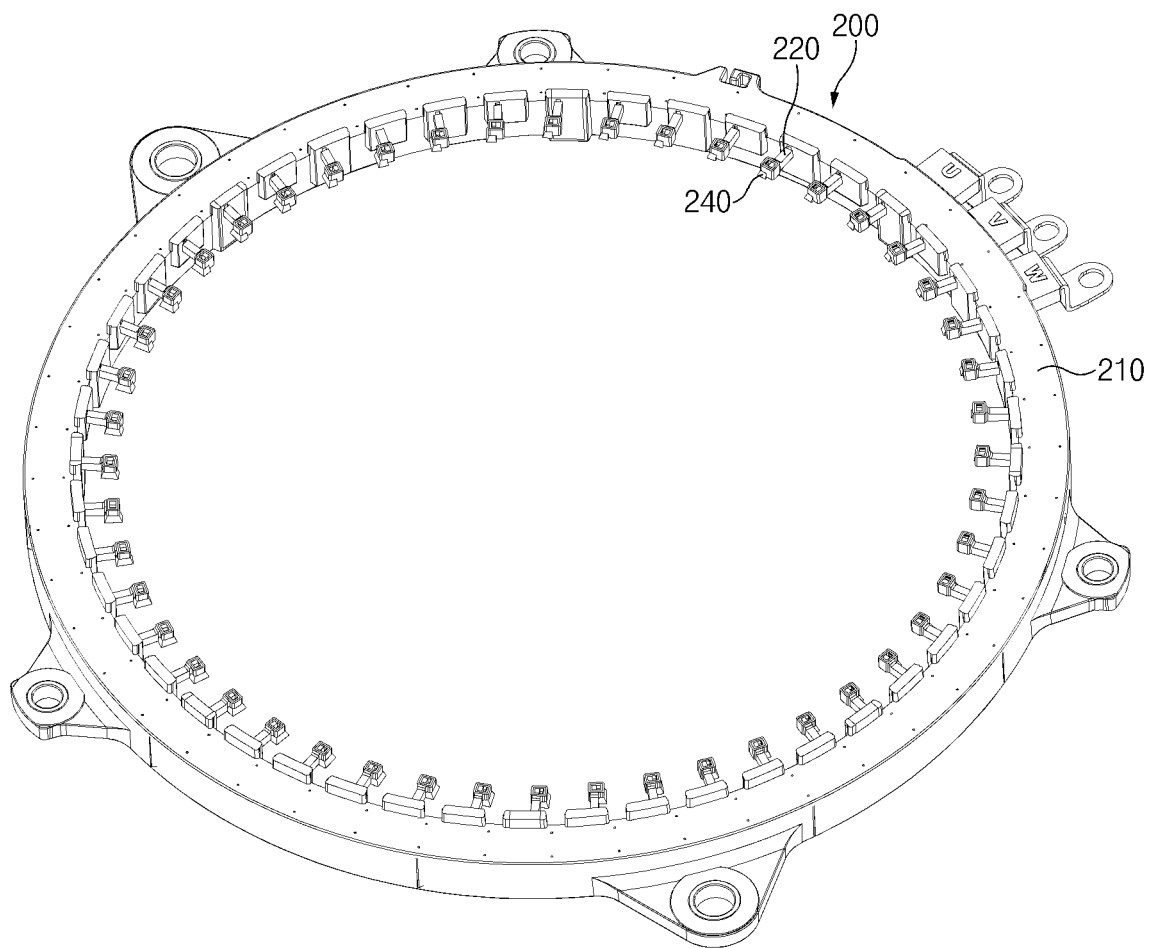
FIG. 8 is a view for explaining a busbar unit for a motor according to another embodiment of the present disclosure.
Figure 9:
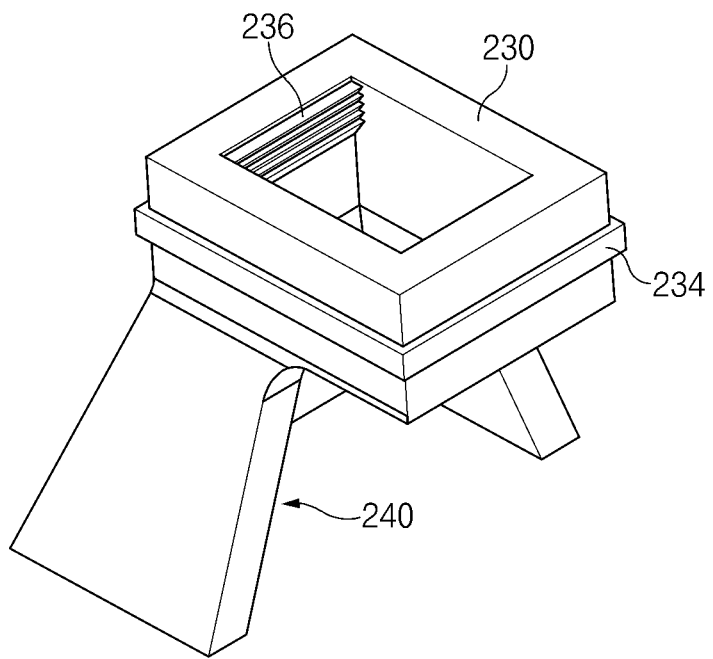
FIGS. 9 and 10 are views for explaining a guide member of the busbar unit for a motor according to another embodiment of the present disclosure.
Figure 10:
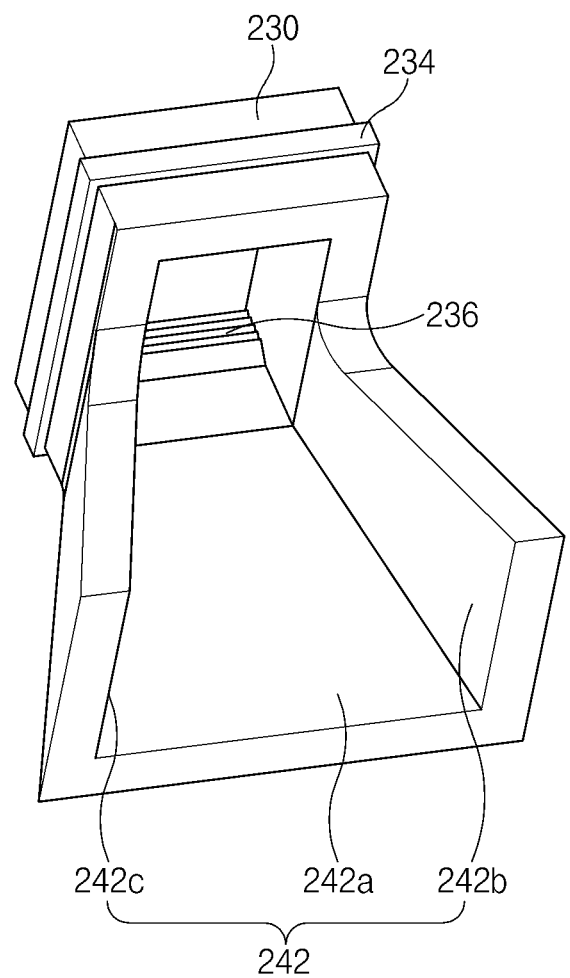
Figure 11:
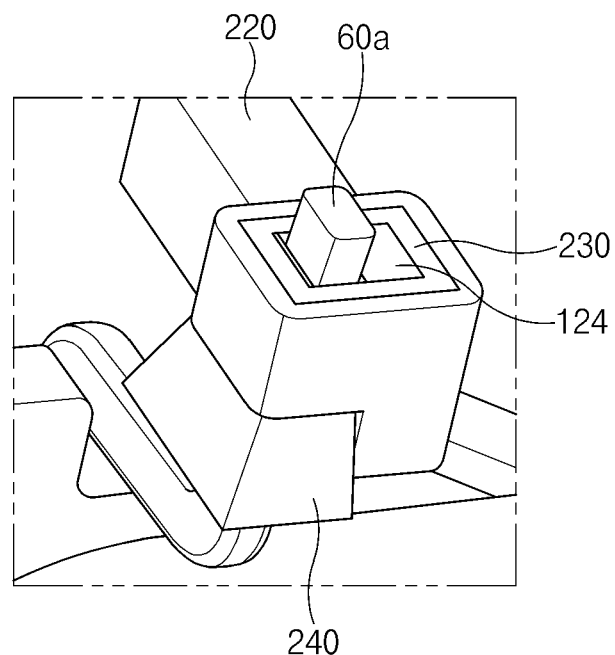
FIGS. 11 and 12 are views for explaining a structure in which a coil is disposed in the busbar unit for a motor according to another embodiment of the present disclosure.
Figure 12:
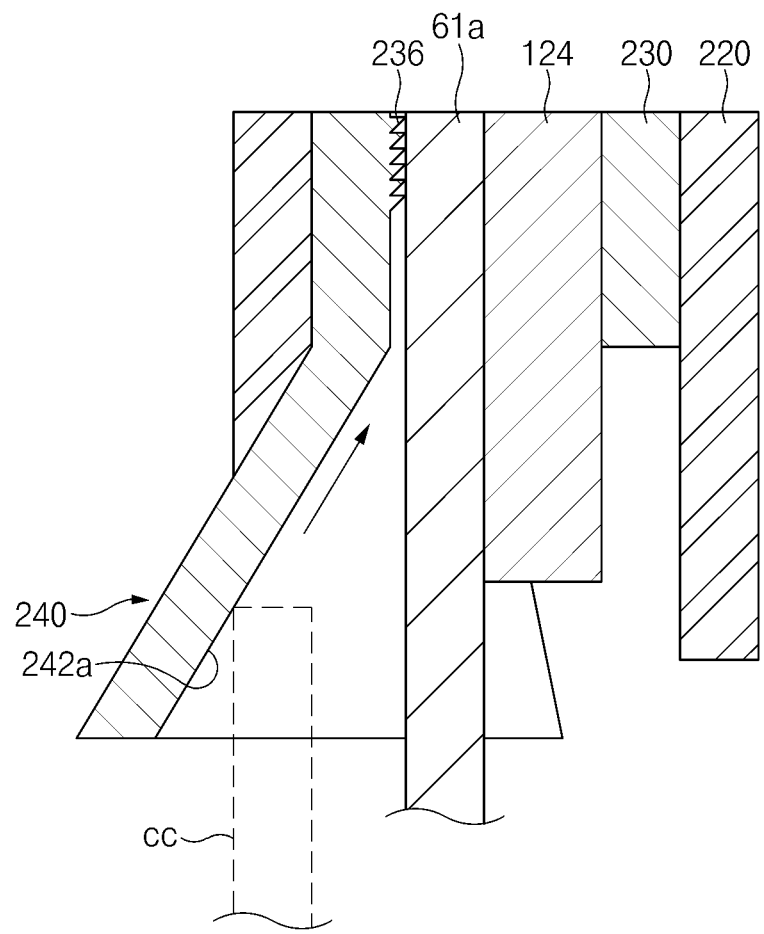

Meanwhile, FIG. 8 is a view for explaining a busbar unit for a motor according to another embodiment of the present disclosure, FIGS. 9 and 10 are views for explaining a guide member of the busbar unit for a motor according to another embodiment of the present disclosure, and FIGS. 11 and 12 are views for explaining a structure in which a coil is disposed in the busbar unit for a motor according to another embodiment of the present disclosure. Further, the parts identical and equivalent to the parts in the above-mentioned configuration will be designated by the identical or equivalent reference numerals, and detailed descriptions thereof will be omitted.

Referring to FIGS. 8 to 12, according to another exemplary embodiment of the present disclosure, the busbar unit 10 for a motor may include a guide member 240 connected to the bushing 230 and configured to guide the coil 60 to the bushing hole 230a.

The guide member 240 is provided to prevent the coil 60 from being erroneously assembled and more easily dispose the coil 60 in the bushing hole 230a.

That is, when the busbar unit 10 and the stator are assembled in a state in which the bushing hole 230a and the end 60a of the coil 60 are misaligned in an upward direction (see CC in FIG. 12), it is difficult to accurately insert the coil 60 into the bushing hole 230a.

However, according to the embodiment of the present disclosure, the guide member 240 may be provided to guide the coil 60 to the bushing hole 230a. Therefore, even though the bushing hole 230a and the end 60a of the coil 60 are misaligned in the upward direction, the end 60a of the coil 60 may be guided to the bushing hole 230a. Therefore, it is possible to obtain an advantageous effect of preventing the coil 60 from being erroneously assembled and an advantageous effect of improving the manufacturing efficiency and reducing the manufacturing time.

The guide member 240 may have various structures capable of guiding the coil 60 to the bushing hole 230a, and the present disclosure is not restricted or limited by the structure of the guide member 240.

For example, the guide member 240 may have an inclined guide portion 242 provided to be inclined therein and configured to guide the coil 60 to the bushing hole 230a.

The inclined guide portion 242 may have various structures capable of defining a guide surface for guiding the coil 60 to the bushing hole 230a.

For example, the inclined guide portion 242 may include a first inclined guide surface 242a (e.g., having a trapezoidal shape) corresponding to one side of the bushing hole 230a that faces the coil 60, a second inclined guide surface 242b connected to one end of the first inclined guide surface 242a and corresponding to another side of the bushing hole 230a, and a third inclined guide surface 242c connected to the other end of the first inclined guide surface 242a and corresponding to still another side of the bushing hole 230a.

For example, the inclined guide portion 242 including the first inclined guide surface 242a, the second inclined guide surface 242b, and the third inclined guide surface 242c may have an approximately "⊏" shape and may define an entry portion disposed below the bushing 230 and further enlarged than an inlet (a lower end) of the bushing hole 230a.

An inclination angle of each of the first inclined guide surface 242a, the second inclined guide surface 242b, and the third inclined guide surface 242c may be appropriately changed in accordance with required conditions and design specifications. According to another embodiment of the present disclosure, the inclined guide portion may include two or less inclined guide surfaces or four or more inclined guide surfaces, and the present disclosure is not restricted or limited by the number of inclined guide surfaces and the structure of the inclined guide surface.

According to the exemplary embodiment of the present disclosure, restriction protrusions 236 may be disposed on the inner wall surface of the bushing hole 230a so as to restrict the coil 60.

The restriction protrusion 236 may have various structures capable of restricting the end 60a of the coil 60 inserted into the bushing hole 230a, and the present disclosure is not restricted or limited by the structure of the restriction protrusion 236 and the number of restriction protrusions 236.

For example, the restriction protrusion 236 may have a triangular cross-sectional shape and be provided in plural in the upward/downward direction.

In the embodiment of the present disclosure, the example in which the restriction protrusions 236 are disposed on the inner wall surface of the bushing hole 230a that faces the end 60a of the coil 60 has been described. However, according to another embodiment of the present disclosure, the restriction protrusion may be disposed on another inner wall surface of the bushing hole.

Since the restriction protrusions 236 are disposed on the inner wall surface of the bushing hole 230a and restrict the end 60a of the coil 60 inserted into the bushing hole 230a as described above, it is possible to obtain an advantageous effect of more effectively inhibiting the separation of the coil 60 inserted into the bushing hole 230a.

As described above, according to the exemplary embodiment of the present disclosure, it is possible to obtain an advantageous effect of simplifying a structure of the busbar unit and improving a degree of design freedom and spatial utilization.

In particular, according to the embodiment of the present disclosure, it is possible to obtain an advantageous effect of minimizing the damage to the coil and the deterioration in durability of the coil during the process of connecting the coil and the terminal.

In addition, according to the embodiment of the present disclosure, it is possible to obtain an advantageous effect of simplifying the manufacturing process, improving the work efficiency, and reducing the manufacturing time.

In addition, according to the embodiment of the present disclosure, it is possible to obtain an advantageous effect of contributing to the reduction in size of each of the busbar unit and the motor in which the busbar unit is mounted.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A busbar unit configured to be electrically connected to a motor, the motor comprising a coil wound around a stator, the busbar unit comprising:
   a terminal comprising a body and a terminal portion protruding from an inner circumferential surface of the body; and
   a holder comprising a holder body configured to support the body and a terminal holder portion disposed on an inner circumferential surface of the holder body and configured to electrically connect the terminal portion and the coil.

2. The busbar unit of claim 1, wherein the terminal holder portion is configured to fix the coil to the terminal portion such that the coil and the terminal portion are in close contact with each other.

3. The busbar unit of claim 2, wherein the terminal holder portion has a terminal hole defined therein, wherein the terminal portion is disposed at one side in the terminal hole, and wherein the coil is accommodated at an other side in the terminal hole so as to be in close contact with the terminal portion.

4. The busbar unit of claim 3, wherein the terminal portion comprises:
   a terminal body disposed in the terminal holder portion; and
   a contact terminal disposed at an end of the terminal body and disposed in the terminal hole so as to be in contact with the coil.

5. The busbar unit of claim 4, wherein the contact terminal comprises a contact surface that contacts the coil.

6. The busbar unit of claim 3, further comprising:
   a bushing having a bushing hole, wherein the bushing is disposed in the terminal hole,
   wherein the coil and the terminal portion are accommodated in the bushing hole.

7. The busbar unit of claim 6, further comprising:
   a pressing protrusion protruding from an inner wall surface of the bushing hole.

8. The busbar unit of claim 6, wherein the bushing and the terminal holder portion are insert-injection molded.

9. The busbar unit of claim 8, further comprising:
   a fixing protrusion protruding from an outer surface of the bushing,
   wherein the terminal holder portion surrounds the fixing protrusion.

10. The busbar unit of claim 9, wherein the fixing protrusion is disposed continuously around the bushing.

11. The busbar unit of claim 6, further comprising:
    a guide member connected to the bushing and configured to guide the coil to the bushing hole.

12. The busbar unit of claim 11, wherein the guide member comprises an inclined guide portion configured to guide the coil to the bushing hole.

13. The busbar unit of claim 12, wherein the inclined guide portion comprises:
    a first inclined guide surface corresponding to a first side of the bushing hole that faces the coil;
    a second inclined guide surface connected to a first end of the first inclined guide surface and corresponding to a second side of the bushing hole; and
    a third inclined guide surface connected to a second end of the first inclined guide surface and corresponding to a third side of the bushing hole.

14. The busbar unit of claim 6, further comprising:
    a restriction protrusion protruding from an inner wall surface of the bushing hole and configured to restrict the coil.

15. The busbar unit of claim 14, wherein the restriction protrusion has a triangular cross-sectional shape.

16. The busbar unit of claim 1, wherein the terminal holder portion and the holder body are integrally injection molded.

* * * * *